(12) United States Patent
Miyamoto et al.

(10) Patent No.: US 8,082,573 B2
(45) Date of Patent: Dec. 20, 2011

(54) BROADCAST RECEIVING DEVICE AND METHOD OF CONTROLLING A BROADCAST RECEIVING DEVICE WITH CONTROLLER FOR UPDATING A PANEL ELEMENT IN A DISPLAY

(75) Inventors: Katsuhiro Miyamoto, Kanagawa (JP); Takashi Yamamoto, Kanagawa (JP); Tomoyuki Ohno, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1109 days.

(21) Appl. No.: 10/853,179

(22) Filed: May 26, 2004

(65) Prior Publication Data

US 2004/0244045 A1    Dec. 2, 2004

(30) Foreign Application Priority Data

May 30, 2003    (JP) ................................. 2003-155163

(51) Int. Cl.
*H04N 1/032* (2006.01)
*G06F 3/12* (2006.01)
(52) U.S. Cl. ........................ 725/141; 358/1.15; 725/153
(58) Field of Classification Search .................... 725/25, 725/28–29, 37, 80, 140–142, 153; 358/1.15
See application file for complete search history.

(56) References Cited

U.S. PATENT DOCUMENTS

| 6,732,367 | B1 * | 5/2004 | Ellis et al. ........................ 725/27 |
| 6,987,540 | B2 * | 1/2006 | Narushima et al. ........... 348/552 |
| 7,200,683 | B1 * | 4/2007 | Wang et al. .................... 709/250 |
| 7,222,155 | B1 * | 5/2007 | Gebhardt et al. ............. 709/204 |
| 2001/0036203 | A1 | 11/2001 | Yamaguchi et al. .......... 370/535 |
| 2002/0004711 | A1 | 1/2002 | Sato et al. ..................... 702/188 |
| 2002/0065950 | A1 * | 5/2002 | Katz et al. .................... 709/318 |
| 2002/0069276 | A1 * | 6/2002 | Hino et al. .................... 709/223 |
| 2003/0028652 | A1 * | 2/2003 | Bardini et al. ................ 709/229 |
| 2005/0158100 | A1 * | 7/2005 | Yamaguchi et al. ............ 400/62 |

FOREIGN PATENT DOCUMENTS

| JP | 2000-350270 A | 12/2000 |
| JP | 2001-119769 | 4/2001 |
| JP | 2001-309463 | 11/2001 |
| JP | 2002-57683 | 2/2002 |
| JP | 2002-118887 | 4/2002 |
| JP | 2003-37750 | 2/2003 |

* cited by examiner

*Primary Examiner* — Hunter Lonsberry
*Assistant Examiner* — Brett Rustemeyer
(74) *Attorney, Agent, or Firm* — Fitzpatrick, Cella, Harper & Scinto (57) ABSTRACT

A controller (1) and target devices (2, 3) are connected via a network. The controller (1) displays an operation panel for controlling the target device (2) at a display device (10) based on information from the target device (2). The controller (1) is capable of changing an element and a user action of the operation panel based on data obtained by data broadcast.

3 Claims, 10 Drawing Sheets

BROADCAST RECEIVING DEVICE AND METHOD OF CONTROLLING A BROADCAST RECEIVING DEVICE WITH CONTROLLER FOR UPDATING A PANEL ELEMENT IN A DISPLAY

BACKGROUND OF THE INVENTION

1. Field of the Invention

The present invention relates to a controlling system, a controlling device, a controlling method, a recording medium and a program. Particularly, the present invention is suitably used in a controlling system for remote-controlling operations of a device connected via a network.

2. Description of the Related Art

As one controlling system for a controlling device (hereinafter referred to as "controller") to remote-control operations of a controlled device (hereinafter referred to as "target device") via a network, there is conceived a controlling system as described below (for example, see Japanese Patent Application Laid-Open (JP-A) No. 2000-350270 and corresponding U.S. patent application Ser. No. 09/579,532).

First, a target device transmits an operation panel, which is stored in advance in a recording medium inside thereof, to a controller via a network. The controller displays the received operation panel at a display device. Then, using a pointing device, a user manipulates a button in the displayed operation panel. Information responsive to the above-mentioned manipulation is transmitted from the controller to the target device. In accordance with the information responsive to the manipulation the target device performs control of the inside of the target device or transmits a new operation panel to the controller. By repeating such operations the controller is able to remote-control operations of the target device via the network.

SUMMARY OF THE INVENTION

However, the above-described controlling system presented a problem such that a controller was not able to change contents of an operation panel. Therefore, it was impossible to add new information to a currently displayed operation panel or to make a part of the operation panel not displayed. These imposed restrictions on providing of a new service to a peripheral device in association with the Internet or broadcasting system.

The present invention was carried out in view of the foregoing. It is an object of the present invention to change operation panels for, based on information from the outside, controlling a controlled device which is connected via a network.

A first aspect of the present invention is a controlling device comprising:

an operation panel to control a controlled device connected via a network; and means for receiving data broadcast including operation panel data so as to change the operation panel based on the operation panel data.

A second aspect of the present invention is a controlling device comprising:

displaying means;

first receiving means for receiving data broadcast;

second receiving means for receiving, from a controlled device connected via a network, information which the controlled device has; and display controlling means for, based on information obtained from the controlled device, displaying an operation panel for controlling the controlled device on the displaying means, in which the display controlling means is capable of changing the operation panel by use of data obtained by the data broadcast.

A third aspect of the present invention is a controlling system comprising:

a controlling device; and at least one controlled device connected to the controlling device via a network, wherein the controlling device includes an operation panel to control the controlled device, and means for receiving data broadcast including operation panel data to change the operation panel based on the operation panel data.

A fourth aspect of the present invention is a controlling method wherein a controlling device having an operation panel to control a controlled device connected via a network receives data broadcast including operation panel data and changes the operation panel based on the operation panel data.

A fifth aspect of the present invention is a program to make a controlling device which has an operation panel to control a controlled device connected via a network receive data broadcast including operation panel data and change the operation panel based on the operation panel data.

A sixth aspect of the present invention is a recording medium to record a program which makes a controlling device having an operation panel to control a controlled device connected via a network receive data broadcast including operation panel data and change the operation panel based on the operation panel data.

DESCRIPTION OF THE PREFERRED EMBODIMENTS

With reference to the drawings, embodiments of the present invention will be described below.

Figure 1:
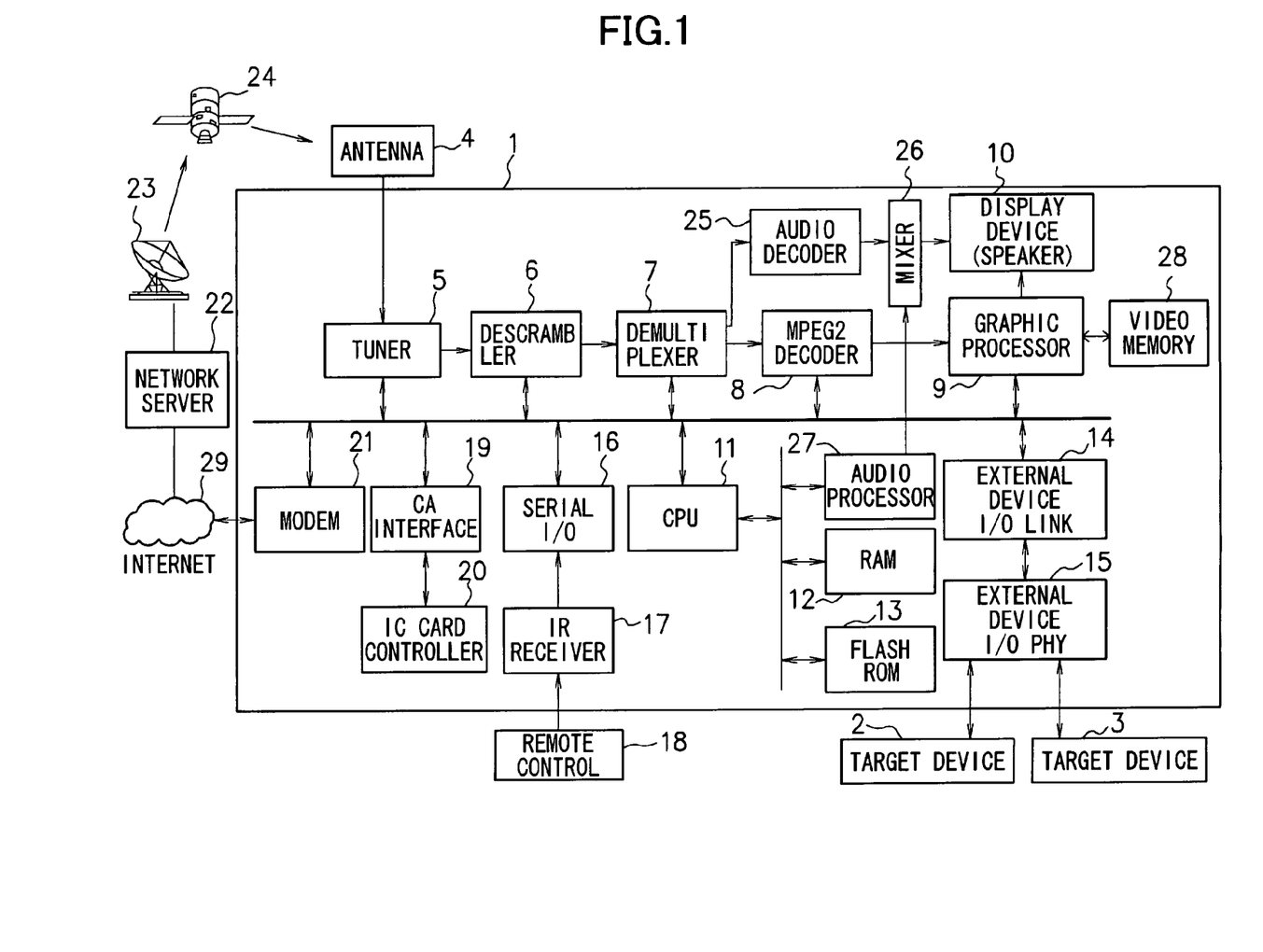
FIG. 1 is a block diagram illustrating a configuration of a controlling system according to the first, second and third embodiments.

FIG. 1 is a block diagram illustrating a configuration of a controlling system (hereinafter, also referred to as "system" simply) according to first, second and third embodiments of the invention.

The system shown in FIG. 1 is a system in which a controlling device (hereinafter referred to as "controller") 1 for performing control and two controlled devices (hereinafter referred to as "target devices") 2, 3 to be controlled are connected via a network.

Here, the network connecting the controller 1 and the target devices 2, 3 is described as a network in conformity with the IEEE-1394, however, the network may be a network in conformity with the IEEE-802.3, IEEE-802.11x and so on. Although the system shown in FIG. 1 has one controller 1 and two target devices 2, 3, it may be provided with at least one controller and at least one target device or with more controllers and more target devices.

In FIG. 1, the controller 1 is provided for performing control of the target devices 2 and 3 via the network. The controller 1 includes a display device 10 for outputting picture and sound based on video data and audio data supplied from the target devices 2 and 3 or picture and sound based on a television signal (hereinafter referred to as "TV signal") received by an antenna 4. The controller 1 is, for example, a digital television (TV), personal computer, set-top box or the like.

Further, the controller 1 is capable of receiving operation panel data (including GUI (graphical user interface) picture data and sound data) transmitted from the target devices 2 and 3 and displaying it on the display device 10. Furthermore, the controller 1 transmits to the target devices 2 and 3 information (command data) for a user to provide instructions of an operation which the user selects by a remote control 18 while looking at the operation panel. This "operation selected by a user" is referred to as "user action" below.

In FIG. 1, although the controller 1 is configured to include the display device 10, the controller 1 and the display device 10 may be provided separately (the display device may be provided in another housing). In such a case, used an interface between the controller 1 and the display device 10, for example, is an NTSC composite signal, a digital video and audio signal or the like. Or, the interface may be in conformity with the IEEE-1394.

The target devices 2 and 3 have a function of inputting and outputting video data and audio data and have communication means (not shown) for transmitting operation panel data and receiving command data. The target device is, for example, a video recording device such as a video cassette recorder, a DVD recorder and a HD recorder, or an image outputting device such as a printer (excluding a display device such as a display and a TV receiver). The target devices 2 and 3 are internally controlled by the target devices 2 and 3 themselves or based on command data or the like input via the network. Further, the target devices 2 and 3 output to the controller 1 operation panel data required to be controlled via the network.

The antenna 4 is for receiving a television signal of the satellite broadcasting, ground-based broadcasting or the like.

A tuner 5 is provided for converting a television signal received by the antenna 4 to a digital signal, and television compressed and modulated video signal and audio signal are further demodulated to MPEG-2 transport stream. Here, the transport stream is a stream having a plurality of mixed packets of compressed video data, compressed audio data, data broadcast data and so on.

A descrambler 6 is provided for descrambling (decoding) encoded data out of compressed video data and compressed audio data supplied from the tuner 5. In order to decode the data, KEY information input in an IC card connected to an IC card controller 20 is inputted to the descrambler 6 via a CA (Conditional Access) interface 19. Then, the descrambler 6 changes combinations of the compressed video data and compressed audio data based on the inputted KEY information and converts the encoded data to a transport stream composed of normal (not encoded) compressed video data and compressed audio data.

A demultiplexer 7 separates each packet of compressed video data, compressed audio data and data broadcast data from the transport stream supplied from the descrambler 6. An MPEG-2 decoder 8 decodes the compressed video data separated at the demultiplexer 7 and converts it to video data. An audio decoder 25 decodes compressed audio data separated at the demultiplexer 7 to convert to audio data.

A graphic processor 9 converts a display format (number of pixels, frame frequency and scanning method) of video data and controls image data drawn by a CPU 11. A video memory 28 stores video data and image data displayed by the display device 10.

The display device 10 displays TV broadcast picture of a television signal and images of image data drawn by the CPU 11. In addition, the display device 10 is provided with a speaker for outputting TV broadcast sound and the like of a television signal.

The CPU 11 controls each function part of the controller 1 in accordance with control procedure (program) stored in a flash ROM (flash memory) 13. A RAM 12 is used as a work memory at program execution by the CPU 11 and as a temporary memory for controlling each function part of the controller 1. The flash ROM 13 is a rewritable memory for storing a program for the CPU 11 and storing device information or the like of the connected target devices 2 and 3.

An external device I/O link part 14 performs transmission control (establishment of data link) for transmitting various video data, audio data and command data between the controller 1 and the target devise 2 and 3. An external device I/O physical (PHY) part 15 directly receives a signal from the connected target devices 2 and 3 to detect a connection state and supplies detected information and communication data from the target devices 2 and 3 to the external device I/O link part 14.

A serial I/O part 16 supplies the CPU 11 with infrared data from the remote control 18 (a signal from the remote control 18) which is received by an infrared light receiving part (IR receiver) 17 and converted to a logic signal. The remote control 18 is provided for a user to select a panel element of the operation panel and select a television channel while looking at image displayed at the display device 10.

A modem 21 enables reading and writing of IC card data via the IC card controller 20 from the external. A network server 22 manages viewing history and accounting information. The network server 22 is connected to be able to communicate with the controller 1 via a network 29 such as the Internet. A broadcasting station 23 performs television broadcast. A satellite 24 is a satellite for television broadcast (transmitting terrestrial antenna for ground-based television broadcast).

A mixer 26 mixes audio data from the audio decoder 25 and audio data from an audio processor 27. The audio processor 27 generates audio data in accordance with instructions from the CPU 11. Mixing of audio data by the mixer 26 may be carried out by digital processing or analog processing.

Next description will be made about operations of a system shown above in FIG. 1. The following description takes an example of devices of the system of FIG. 1 being connected as shown in FIG. 2.

Figure 2:
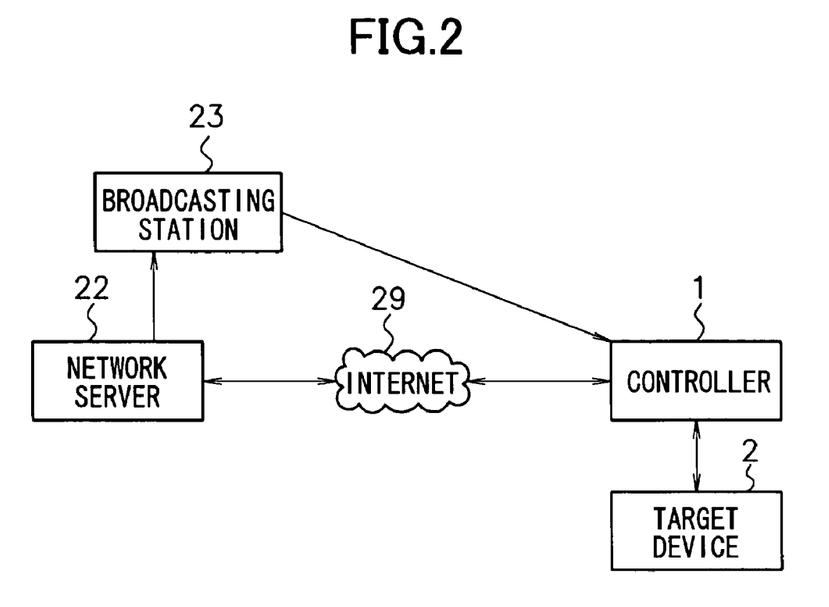
FIG. 2 is a view illustrating connection of devices for describing operations thereof in a network system according to an embodiment of the present invention.

FIG. 2 shows a connection example of devices in the system shown in FIG. 1. The controller 1 is capable of data transmission/reception with a target device 2 and of data transmission/reception with the network server 22 via the network 29. In addition, the network server 22 is capable of data transmission with the broadcasting station 23 and the broadcasting station 23 is capable of data transmission with the controller 1.

However, the network server 22 is provided for receiving ID information (network ID, PID (Packet Identifier) and the like) of the broadcasting station 23 required to receive operation panel data from data broadcast by the broadcasting station 23 and for, when there is a problem in received data of data broadcast, notifying as such. The network server 22 is usually provided by a manufacture which provides the target device 2.

First Embodiment

In the first embodiment described below, the controller 1 in the system shown above in FIG. 1 is a digital television and the target device 2 is a printer. Also in this description of the first embodiment, instead of the operation panel (FIG. 3) based on operation panel data from the target device 2, an operation panel (FIG. 4) based on data broadcast data from the broadcasting station 23 is used to be displayed on the display device 10 of the controller 1.

The operation panel is a GUI (operation screen) for controlling a target device and displaying a state of the target device, and is particular to (depending on) device type, manufacture and the like of the target device. A general screen of Electronic Program Guide or the like is not included in the operation panel described herein.

Figure 3:
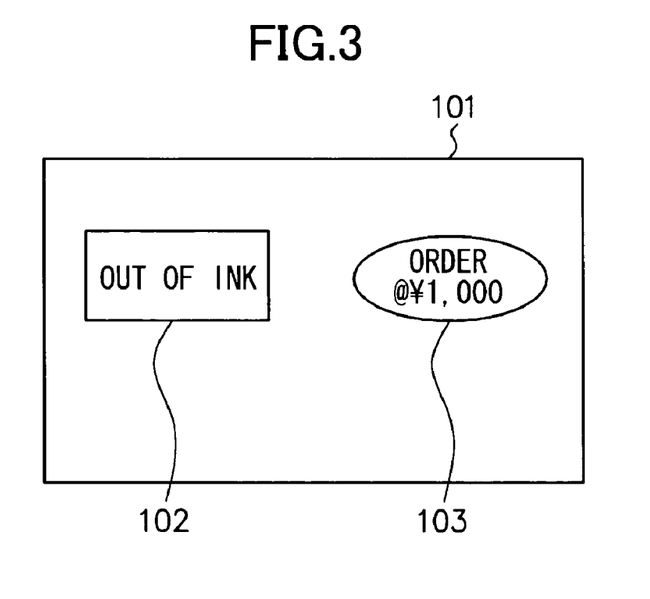
FIG. 3 is a view illustrating an operation panel based on information from a target device according to the first embodiment.
Figure 4:
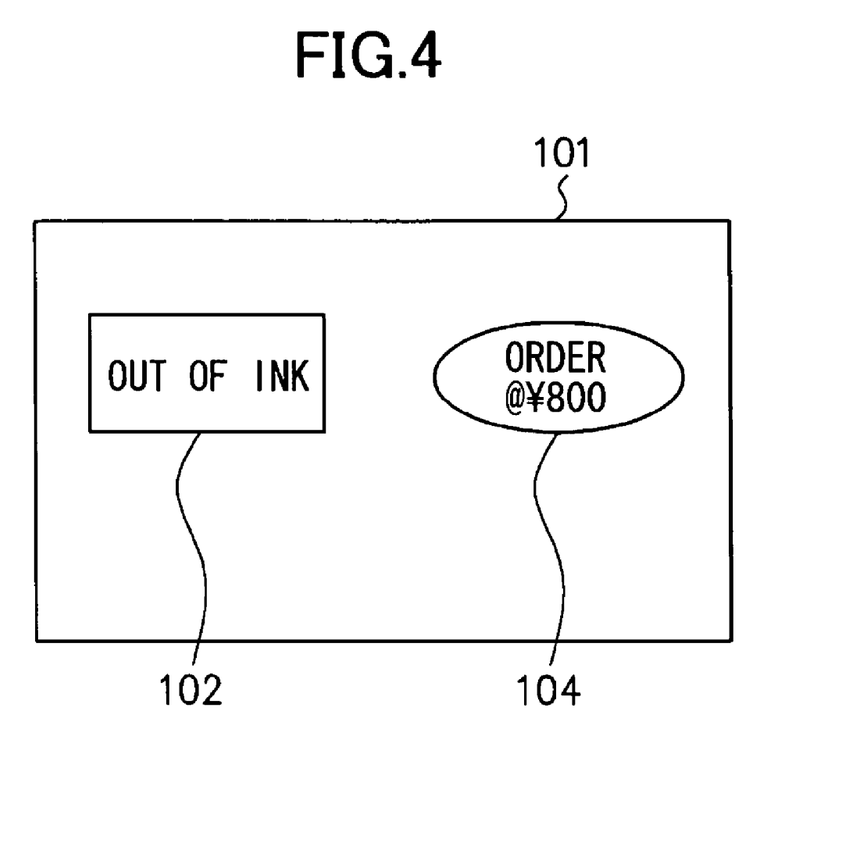
FIG. 4 is a view illustrating an operation panel based on information from a broadcasting station according to the first embodiment.

FIGS. 3 and 4 show an example of an operation panel displayed on the display device 10. In the display screen 101 there are disposed panel elements (such as GUI) 102, 103 and 104 consisting in the operation panel.

Figure 5:
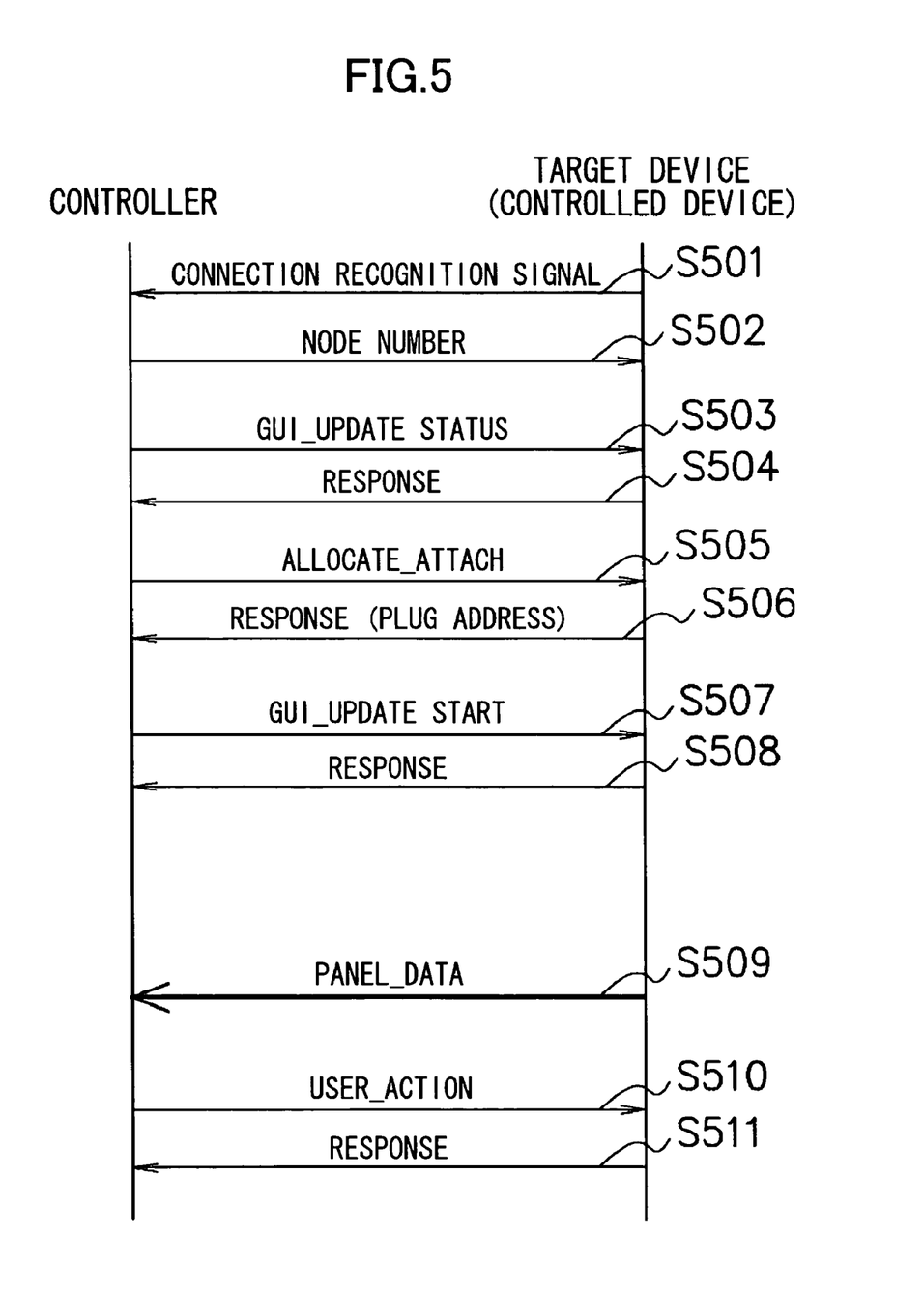
FIG. 5 is a view illustrating a transfer sequence of operation panel data between a controller and a target device.

First description is made about transfer of operation panel data from the target device 2 to the controller 1 with reference to FIG. 5.

FIG. 5 shows an example a transfer sequence of operation panel data between the controller 1 and the target device 2.

(1) In the controller 1, after turning on the power (switching on), the external device I/O physical part 15 detects a connected target device 2 via the network. Detection of this target device 2 may be performed by a method specified in the IEEE 1394-1995 specification, for example. The target device 2 transmits to the controller 1 a connection recognition signal including device information (device type ID, manufacture ID and the like) (S501).

(2) The CPU 11 in the controller 1 receives the connection recognition signal, which the external device I/O physical part 15 received from the target device 2, via the external device I/O link part 14, and the CPU 11 stores in the RAM 12 device information (device type ID, manufacture ID and the like) of the target device 2 obtained from the connection recognition signal.

The CPU 11 assigns a node number to the detected (recognized) target device 2 and transmits the data to the target device 2 (S502).

(3) The controller 1 transmits to the target device 2 a confirmation requesting signal (Gui_updata Status command) for confirming whether the target device 2 holds operation panel data or not (S503). Transmission of the confirmation requesting signal is performed under control of the CPU 11 based on a program stored in the flash ROM 13. Here, the confirmation requesting signal is a signal (command) provided in advance between the controller 1 and the target device 2, which signal being transmitted to the target device 2 in a particular format via the external device I/O link part 14 and the external device I/O physical part 15.

(4) The target device 2 sends to the controller 1 response information (response) in reply to the confirmation requesting signal (S504). By use of this response information, the CPU 11 can know whether the target device 2 holds operation panel data or not and where the operation panel data is when the target device does not hold the data.

For example, when a data field in the response information (hereinafter referred to as "first data field" for convenience) is "00", the operation panel data is in the target device 2, while for the first data field being "01", the operation panel data is seen in the data broadcast transmitted by television broadcasting. When the first data field is "02", the operation panel data is in an external network server 22. The first data field indicates a location of the operation panel data.

Further, when the first data field is "01", a supplier from which the operation data is obtained including a network ID of broadcast to be received, a name of a broadcasting station, a receiving frequency, a PID, a polarization method is described in another field in the response information. Thereby, the controller 1 is capable of recognizing by which channel information the operation panel data is acquired. In addition, since a receiving condition to receive the above-mentioned operation panel data is sometimes different due to a broadcasting date, broadcasting state and the like, an address indicative of the location of the operation panel data on the network (for example, URL: Uniform Resource Locator) is stored so as to receive the operation panel data from the network server 22. Further, when the first data field is "02", an address indicative of the location of the operation panel data on the network is described in another field in the response information so as to receive the operation panel data from the network server 22. These addresses are also included the supplier information of the operation panel data.

In the first embodiment, it is assumed that the operation panel data is the target device 2 (the first data field is "00").

(5) Then, in order to receive the operation panel data from the target device 2, the CPU 11 allocates a plug to establish a connection for data transfer with the target device 2. This "plug allocation" is required to determine plug addresses for the devices to transmit and receive data together so as to transmit data to each of the plug addresses, not to add a destination address to each piece of data to be transferred. With this configuration, in transferring a large amount of video data, it is not necessary to add a destination address to every packet data, thereby shortening a transfer time.

Specifically, the controller 1 transmits to the target device 2 a plug address notifying signal (Allocate_attach command) which notifies a plug address of the receiver (controller 1) (S505). In reply to the plug address notifying signal, the target device 2 transmits a destination plug address as response information to the controller 1 (S506). Thereby, since the transfer address is known to both of the controller 1 and the target device 2, the plug connection can be established.

(6) The CPU 11 stores in the flash ROM 13 plug address information of the target device 2 which is obtained from the response information in reply to the plug address notifying signal.

(7) The CPU 11 transmits to the target device 2 an operation panel transfer start requesting signal (Gui_update Start command) which requests to start transfer of the operation panel data (S507).

(8) When the target device 2 is in a state to transmit operation panel data, it transmits response information to the controller 1 in reply to the operation panel transfer start requesting signal (S508).

From this processing S508, it becomes possible to transmit operation panel data from the target device 2 to the controller 1.

(9) When there is little ink remaining inside, for example, the target device 2 transmits operation panel data to a plug address provided in advance between the target device 2 and the controller 1 (S509). In the first embodiment, the target device 2 transmits the operation panel data of the operation panel consisting of two panel elements 102 and 103 as shown in FIG. 3.

At this time, added to the each panel element of the operation panel are a particular element ID number, an element type, a conditional expression, display panel data (for example, bit map data) and the like. The aforementioned element type includes a button, a toggle switch and the like while the aforementioned conditional expression includes a conditional expression such that when certain device type ID display panel data is transmitted via data broadcasting, a panel element according to the display panel data is displayed, and when not, a panel element in accordance with the display panel data from the target device 2 is displayed.

In the first embodiment, it is assumed that a conditional expression such that when display panel data for the added device type ID is transmitted by data broadcasting, a panel element corresponding to the display panel data is displayed, and when the display panel data is not transmitted, a panel element according to display panel data from the target device 2 is displayed, is added to the panel element 103 shown in FIG. 3.

The CPU 11 processes a conditional expression of the panel element 103 and confirms whether the display panel data by data broadcasting for device type ID added to the panel element 103 exists in the flash ROM 13 or not. As a result of confirmation, when the data broadcast data including display panel data corresponding to the panel element 103 exists, the CPU 11 checks a data valid period included in the data broadcast data. Then, if it is during the data valid period, the CPU 11 reads from the flash ROM 13 display panel data corresponding to the panel element 103 and overwrites the data on a field of the RAM 12 in which the display panel data of the panel element 103 transmitted from the target device 2 is stored.

On the other hand, when data broadcast data including display panel data corresponding to the panel element 103 does not exist in the flash ROM 13, the CPU 11 does overwrite nothing on the display panel data of the panel element 103 from the target device 2 stored in the RAM 12. However, a data format described in the data broadcast and its contents will be described later.

(10) The CPU 11 transfer the display panel data stored in the RAM 12 to the graphic processor 9 to draw the data in the video memory 28.

(11) The graphic processor 9 outputs data in the video memory 28 to the display device 10 in accordance with the refresh rate of the display screen of the display device 10, and an operation panel consisting of panel elements 102, 103 (as described above, the panel element 103 may be changed to 104) received from the target device 2 is displayed on the display device 10.

(12) Then, when a user of the controller 1 uses the remote control 18 to start a user action to a panel element of the operation panel, the CPU 11 outputs user action information (information indicating that the panel element is pushed or released) corresponding to the panel element and an element ID number to the target device 2 (S510). The target device 2 performs processing corresponding to the received user action information and the element ID number and outputs response information to the controller 1 (S511).

In the first embodiment, as shown in FIG. 3, data of the panel element 103 transmitted from the target device 2 is data of "ink ¥1,000", however, data of the panel element 104 corresponding to the panel element 103 transmitted by data broadcasting as shown in FIG. 4 is "ink ¥800 (for campaign)". This is one example that when a manufacture as provider of the target device 2 sells inks at a discounted price in a certain time, the manufacture changes the operation panel (panel element) by use of data broadcasting.

The above-mentioned data broadcast data may include bitmap data, text data, moving picture data, still picture data and sound data.

(Data Broadcast Receiving Method)

Next description is made about a data broadcast data receiving method and a data format.

The data broadcast data, video data and audio data received at the antenna 4 shown in FIG. 1 are demodulated by the tuner 5 to be converted to a transport stream of packet data. Then, the transport stream is decoded at the descrambler 6 to be converted to a viewable transport stream.

This decoding is carried out by converting a data array by a function expression and a function parameter thereof. The function parameter is written as KEY information in an IC card which is inserted to the IC card controller 20. The KEY information on the IC card is rewritable from the outside via the modem 21. For example, in the first embodiment, the network server 22 transmits a condition for discount as KEY information to the IC card via the network 29, and the discount can be displayed only when the KEY information are matched.

A transport stream decoded at the descrambler 6 is provided to the demultiplexer 7 and separated into data broadcast data, video data and audio data.

FIG. 6 shows an example of a transport stream including data regarding the operation panel.

Figure 6A:
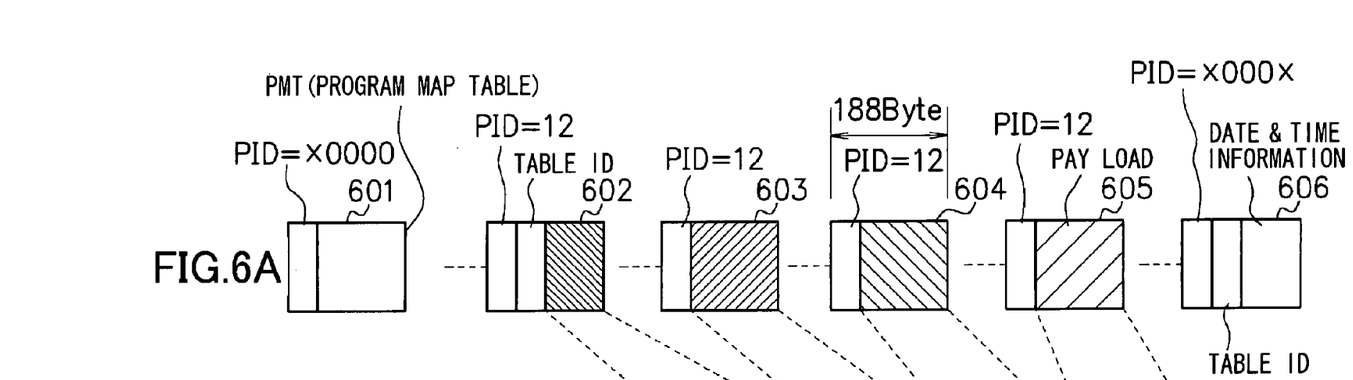
FIGS. 6A to 6D are views illustrating a transport stream.

The transport stream is a bit stream string which is obtained by dividing plural pieces of data broadcast data, video data and audio data into small packets having identification information called PID. Selection of this transport stream requires a receiving frequency of the tuner 5, and information regarding the receiving frequency is described in the response information from the target device 2 in reply to the confirmation requesting signal.

Figure 6B:
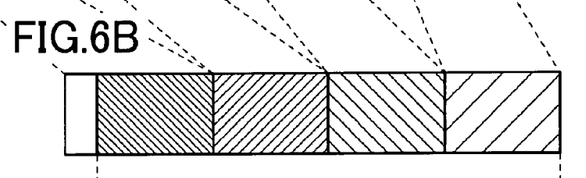

Further, used as PID information of a packet of the operation panel data inside is a PID described in the transport stream (PMT: Program MAP Table) shown in FIG. 6 if it is determined in advance between the broadcasting station 23 and a manufacture as a provider of the target device 2. When the PID of a packet of the operation panel data inside is changed on a temporary basis by the broadcasting time, broadcasting pattern and the like, the PID information of the packet may be set to be obtained from the network server 22.

In such a configuration, information for taking access to the network server 22 and the like may be described in response information in reply to the confirmation requesting signal.

The transport stream includes map data which indicates which data out of broadcast data, video data and audio data is stored in the stream. Based on this map data, the transport stream is divided into the data broadcast data, video data and audio data.

In dividing the transport stream into the data broadcast data, video data and audio data, first, PAT (Program Association Table) packet 601 which indicates in which PID packet the broadcast data, video data and audio data exist is extracted. The PAT packet 601 is determined as PID=0x0000.

Specifically, the CPU 11 provides the demultiplexer 7 with PID information "0x0000" of the PAT packet 601, and thereby, a packet of PID=0x0000 is read and stored in the RAM 12.

The CPU 11 recognizes to which PID information packet data of the data broadcast, video and audio belongs from the information (PMT) of the PAT packet 601 shown in FIG. 6D.

The CPU 11 provides the demultiplexer 7 with PID information of a video packet ("10" in the first embodiment) and instructs to provide packet data of "PID=10" to the MPEG 2 decoder 8. Likewise, it provides the demultiplexer 7 with PID information of an audio packet ("11" in the first embodiment) and instructs to provide packet data of "PID=11" to the audio decoder 25.

Further, the CPU 11 provides the demultiplexer 7 with PID information of a data broadcast packet ("12" in the first embodiment). The packet data of "PID=12" is stored in the RAM 12 by the CPU 11. At this point, Table id information is searched from packet data of each PID to detect Table id information indicative of the beginning and the length of the data. Based on the aforementioned Table id information, the CPU 11 appropriately rearranges the data broadcast data stored in the RAM 12 as shown in FIG. 6B and stores the data in the RAM 12 again.

Data obtained by rearranging packet data of "PID=12" based on the Table id information as described above is shown in FIG. 6C.

Figure 6C:
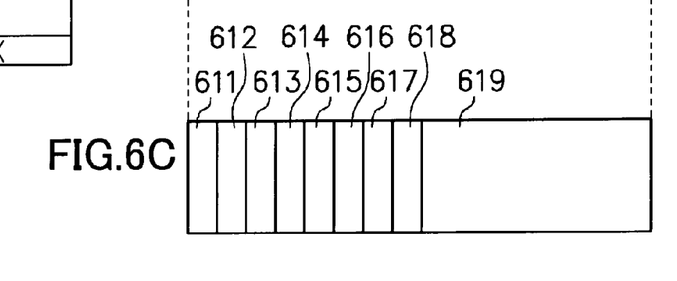
Figure 6D:
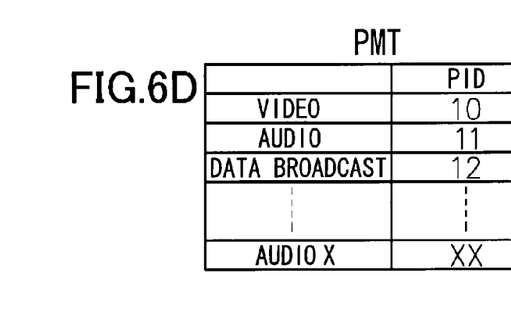

As shown in FIG. 6C, length information (the number of bits) of each data piece is written in a header portion 611 of the data. Written in the following portion is information regarding an operation panel corresponding to the length information of the above-mentioned header portion 611. In the example shown in FIG. 6C, the information includes a manufacture ID code 612 of a target device (target_device_comp), a device type ID code 613 of the target device (target_device), a version number 614 (Version), valid period data 615 (expire), a conditional expression flag 616 (Broad_flag), a panel element ID number 617 for an additional operation panel display (Broad_change_panel), display panel data 619 (Broad_panel_data) and user action ID information 618 (Broad_User_Action) to be outputted to the target device 2 when a panel element to be displayed is selected by a remote control.

The CPU 11 stores this information in the flash ROM 13 based on the necessity. In storing the information, the CPU 11 checks the valid period data 615 in the received data broadcast data, and when the valid period expires at the present date and time, the information is not stored in the flash ROM 13. The present time compared with the valid period data 615 is stored in a packet specified by a certain PID and Table id (predetermined for each broadcast to be received) in the transport stream as described above.

The CPU 11 provides the predetermined PID information to the demultiplexer 7, receives packet data (time data) corresponding to the PID information and stores it in the RAM 12 on regular basis.

Thus, the data broadcast data (data regarding the operation panel and the like) transmitted by the data broadcasting is stored in the flash ROM 13 of the controller 1.

As described above, according to the first embodiment, the controller 1 receives the operation panel data transmitted by the data broadcasting and stores the data in the flash ROM 13. In accordance with the operation panel data from the target device 2, for example, when the operation panel data corresponding to the device type ID of the target device 2 is received by the data broadcasting and stored in the flash ROM 13, the operation panel is changed based on the operation panel data by data broadcasting and when not, the operation panel based on the operation panel data from the target device 2 is used.

The controller 1 determines based on information received (obtained) from the target device 2 (a device type ID, a manufacture ID, a location of the operation panel data/a supplier from which the data is obtained/an obtaining method/a receiving condition, a conditional expression added to a panel element and the like), whether or not the operation panel is changed, which operation panel data out of that received from the target device 2 and that received by data broadcasting is used and which data piece in the plural pieces of the operation panel data received by the data broadcasting is used, and displays an operation panel suitable for the target device 2.

Thereby, the controller 1 is capable of changing the operation panel data for controlling the target device 2 to operation panel data transmitted by data broadcasting. Accordingly, it is possible to readily change by data broadcasting the operation panel data for controlling a target device connected via the network, and to provide a new service regarding the target device (peripheral device and the like).

Further, the controller 1 checks the valid period data 615 in the data broadcast data (operation panel data) received by the data broadcasting, and when the valid period expires, does not store the data in the flash ROM 13. Furthermore, the controller 1 checks the valid period data 615 in the data broadcast data (operation panel data) already stored in the flash ROM 13 and when the valid period expires, does not change the operation panel data based on the data.

With this configuration, it is possible to prevent the operation panel data for controlling the target device 2 from being changed to invalid operation panel data of which the valid period expires and, for example, to change the operation panel data during a certain period so as to use latest operation panel data appropriately.

In receiving of operation panel data, various data broadcasting systems can be utilized including ground-based analog broadcasting, ground-based digital broadcasting, cable analog broadcasting, cable digital broadcasting, BS analog broadcasting, BS digital broadcasting, CS analog broadcasting, CS digital broadcasting, Internet (broadband) broadcasting and the like.

Second Embodiment

Next description will be made about the second embodiment.

The first embodiment has been described above with an example that in the system shown in FIG. 1 above, instead of an operation panel based on an operation panel data transmitted from the target device 2, an operation panel based on data broadcast data from the broadcasting station 23 is used to be displayed on the display device 10.

In the second embodiment, in the system shown in FIG. 1 above, it is assumed that the controller 1 is a digital television and the target device 2 is a video cassette recorder, an operation panel (FIG. 7) based on operation panel data from the target device 2 is changed to an operation panel (FIG. 8) based on data broadcast data from the broadcasting station 23 based on a logic condition added to the operation panel data and the changed operation panel is displayed at the display device 10.

Figure 7:
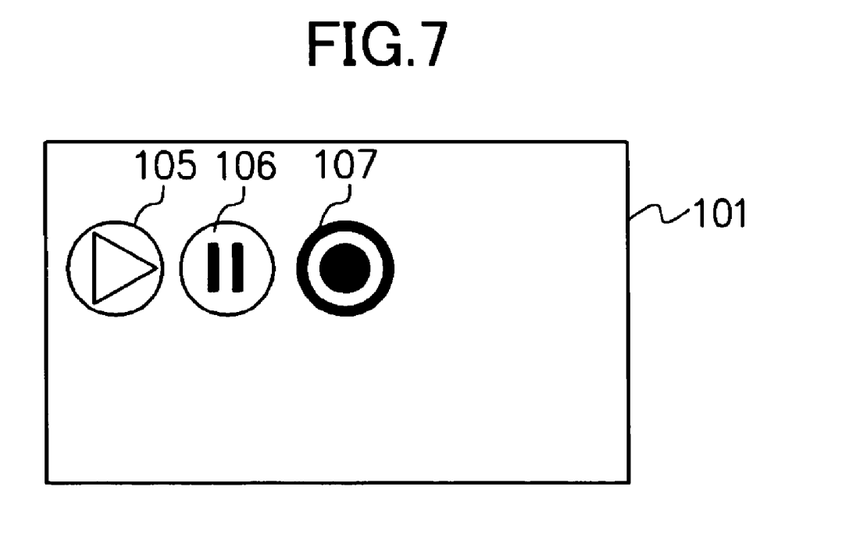
FIG. 7 is a view illustrating an operation panel based on information from a target device according to the second embodiment.
Figure 8:
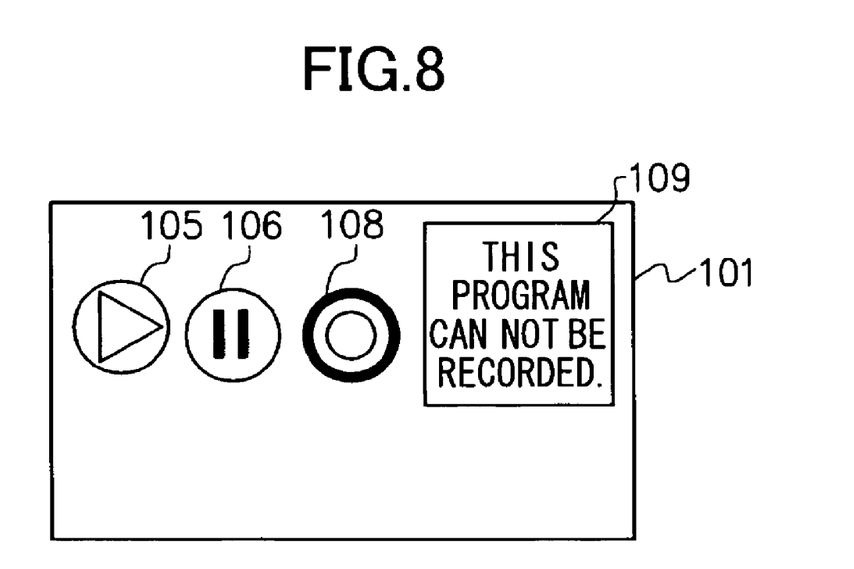
FIG. 8 is a view illustrating an operation panel changed based on information from a broadcasting station according to the second embodiment.

FIGS. 7 and 8 show an example of an operation panel to be displayed at the display device 10. In the screen 101, panel elements 105, 106, 107, 108 and 109 which consist in the operation panel are arranged.

In the second embodiment, it is assumed that a conditional expression A as described below is added to the panel element 107. Based on this conditional expression A, it is determined which operation panel data is to be selected.

<Conditional Expression A>

IF a conditional expression flag of the panel element 107 in the data broadcast data (Broad_flag)="true" (1 for positive logic and 0 for negative logic)

THEN change the panel element (panel element 107-→(Broad_panel_data))

,change a user action (user action of panel element 107-→(Broad_User_Action))

In other words, when the conditional expression flag 616 of the panel element 107 of the data broadcast data shown as an example in FIG. 6C above is "true", the display panel data and user action information of the panel element 107 are changed into display panel data 619 and user action information 618 of the data broadcast data, respectively.

Since a connection sequence between the controller 1 and the target device 2 in the second embodiment and the like are the same as shown in the processing S501 to S509 on FIG. 5, description thereof is omitted here. Further, in the description below, the conditional expression flag is assumed as positive logic.

Figure 9:
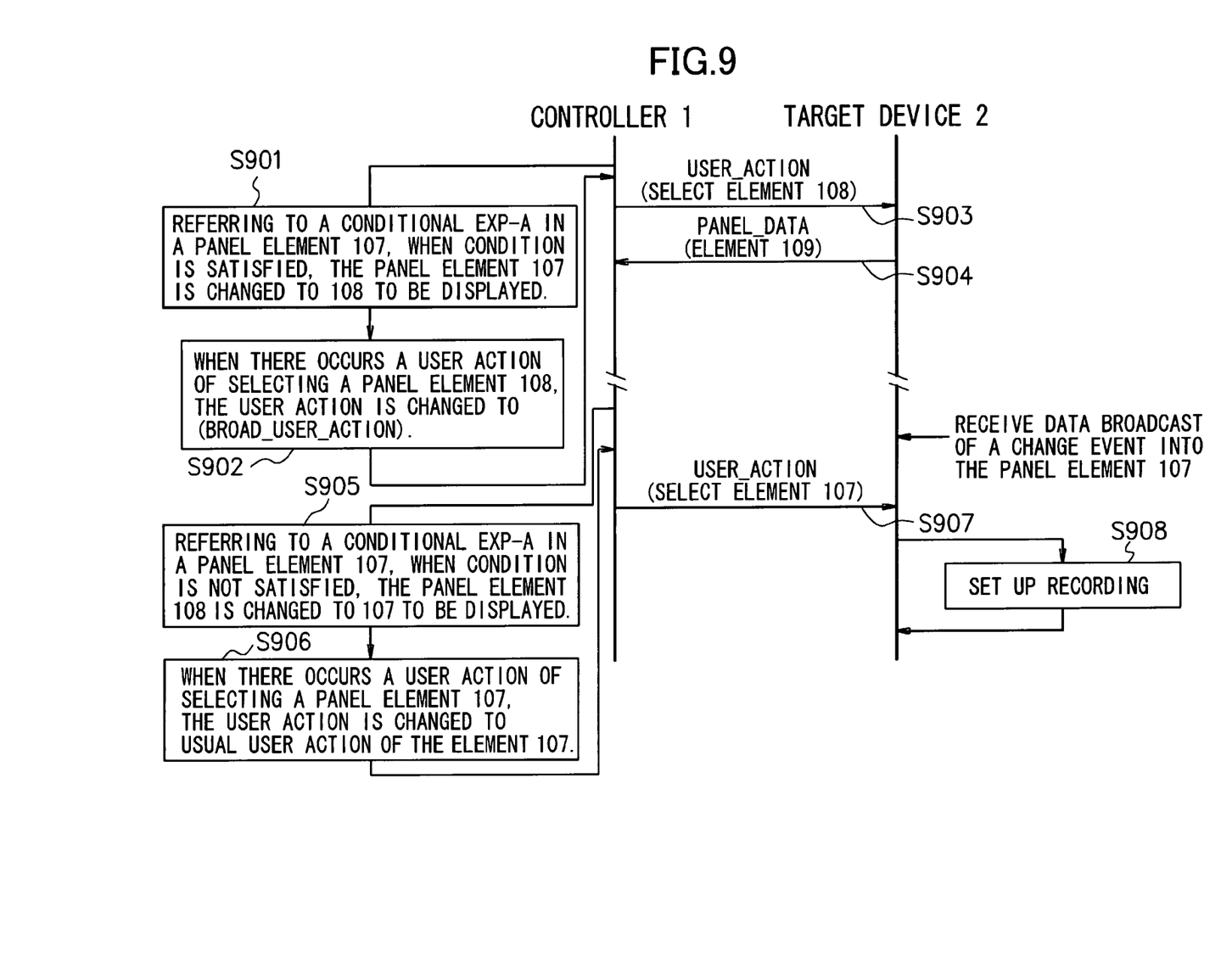
FIG. 9 is a view illustrating an operational sequence of a controller and a target device according to the second embodiment.

The operations after the processing S509 shown in FIG. 5 are described with reference to a sequence view shown in FIG. 9.

(1) When the controller 1 receives the operation panel data regarding the panel element 107 from the target device 2, the CPU 11 stores a conditional expression A added to the operation panel data in the RAM 12.

(2) The CPU 11 compares the element ID number of the panel element 107 stored in the RAM 12 with an element ID number 617 in each data of the data broadcast, stored in the flash ROM 13.

(3) As a result of comparison, when there is data broadcast data of which the element ID number matches, the CPU 11 reads the latest conditional expression flag 616 stored together with the element ID number from the flash ROM 13.

(4) The CPU 11 determines whether the read data of the conditional expression flag 616 is "1" (true) or 0" (false)

(5) After the determination above, when the conditional expression flag 616 is true, following the conditional expression A stored in the RAM 12, the display panel data 619 stored together with the element ID number of the panel element 107 is read from the flash ROM 13 and supplied to the graphic processor 9 instead of the display panel data of the panel element 107.

(6) The graphic processor 9 draws the supplied panel data in the video memory 28, and outputs it to the display device 10 in accordance with a refresh cycle of the display device 10 to display the operation panel on the display device 10 (S901).

Then, the panel element 108 is set to prevent a user of the controller 1 from operate recording. For example, when receiving a copy-inhibit digital TV program, the user is informed of that it is inhibited to record (copy) the digital TV program via the operation panel of the video cassette recorder displayed on the screen.

(7) In addition, when the user of the controller 1 uses the remote control 18 to start a user action to the panel element 108, the CPU 11 changes the user action information to be transmitted to the target device 2 into user action information 618 stored in the flash ROM 13 (S902) and outputs it to the target device 2 (S903).

(8) Receiving the user action information of the panel element 108, the target device 2 transmits data of the panel element 109 to the controller 1 (S904). Here, a display time attribute is added to the panel element 109, which is displayed on the display device 10 only during the set display time.

As described above, the panel element (for example, panel element 109) corresponding to the user action is prepared in advance in the target device 2 by a manufacture which provides the target device 2, and the manufacture notifies the broadcasting station 23 of the user action. Or, data for the element ID of the panel element 108 (data of the panel element 109) may be transmitted by data broadcasting so that the controller 1 reads the data from the flash ROM 13 and display it just like the above-described method.

(9) Then, a certain time later, when receiving a copyable (recordable) digital TV program, the CPU 11 changes the panel element 108 to the panel element 107 to display the operation panel (S905), and switches the user action information into user action information for the panel element 107. In other words, the CPU 11 changes the operation panel to be displayed on the display device 10 from the operation panel of FIG. 8 to the operation panel of FIG. 7.

(10) When the user of the controller 1 starts a user action to the panel element 107 by user of the remote control 18, the CPU 11 outputs to the target device 2 user action information based on the operation panel data from the target device 2 (S906, S907).

(11) Receiving the user action information of the panel element 107, the target device 2 is shifted to the usual recording operation (S908).

As described above, according to the second embodiment, the controller 1 changes operation panel data for controlling the target device 2 based on the operation panel data transmitted by data broadcast in accordance with the logic condition added to the operation panel data from the target device 2, and also changes an operation panel based on the operation panel data and, in accordance with an operation for the operation panel, user action information to be transmitted to the target device 2 and the like. Thereby, it is possible to change the operation panel data for controlling the target device 2 to operation panel data in accordance with executable control to the target device 2.

For example, when image recording is inhibited, a recording button of the target device 2 is changed to the panel element 108 indicative of recording inhibition as described above, and the user action to the panel element 108 is set not to start usual recording operation at the video cassette recorder of the target device 2. With this configuration, there is no worry that even if a user accidentally pushes a recording button (panel element 108) unnecessary data is recorded. Furthermore, since a reason not to set up recording operation (panel element 109) is displayed on the screen, a user can know it is not because of failure of the target device 2 that the recording operation is not started.

Third Embodiment

Next description will be made about the third embodiment.

In the above-described first and second embodiments, when an operation panel is displayed on the display device 10, first, operation panel data transmitted from the target device 2 is received. On the other hand, according to the third embodiment, the operation panel data from the target device 2 is not received and data broadcast data transmitted from the broadcasting station 23 is used to display the operation panel shown in FIG. 3 on the display device 10.

Here in the third embodiment, it is assumed that the controller 1 is a digital television and the target device 2 is a printer.

Figure 10:
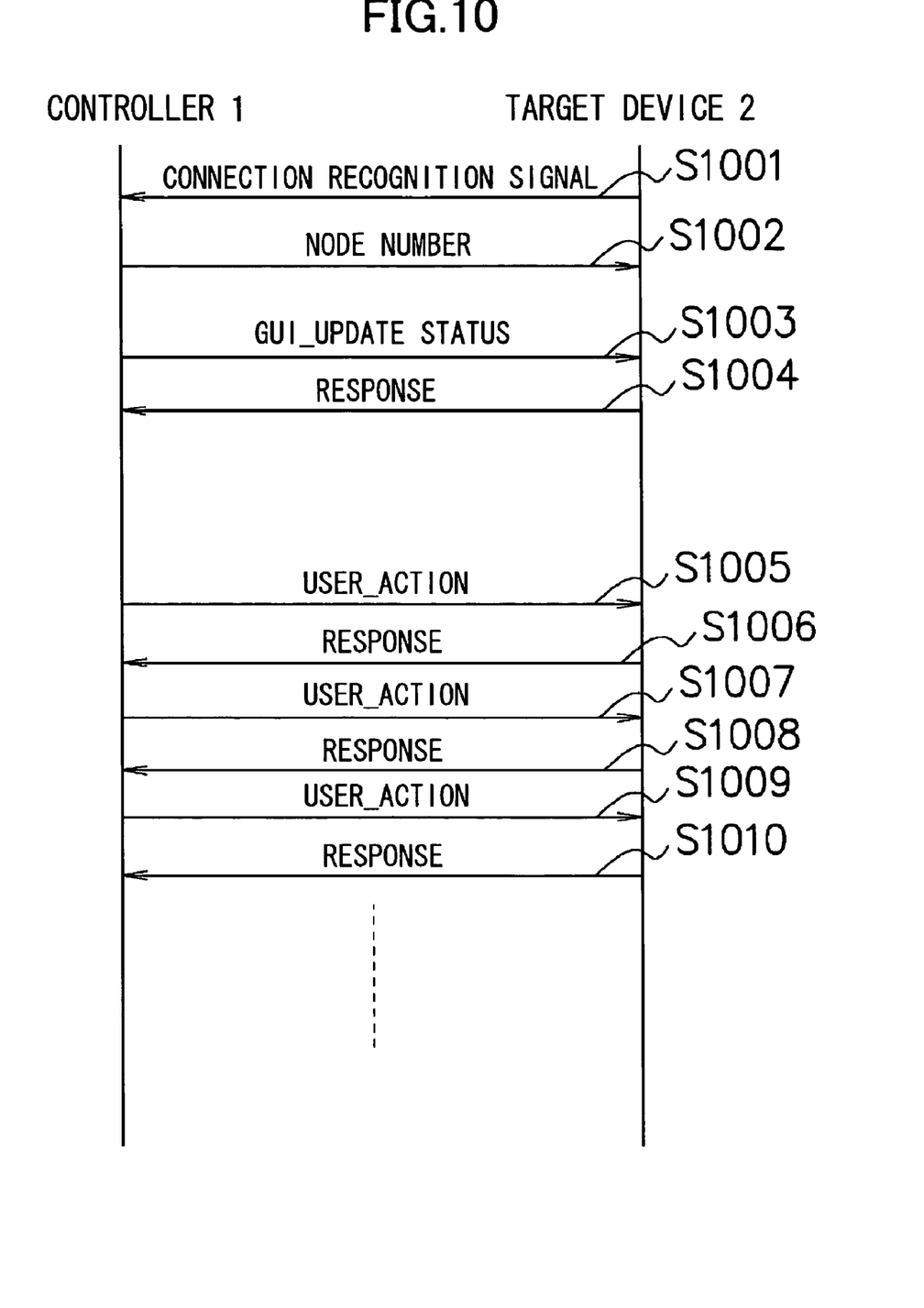
FIG. 10 is a view illustrating a transfer sequence of information on an operation panel between a controller and a target device.

Based on a sequence view on FIG. 10, transfer of information regarding an operation panel between the controller 1 and the target device 2 is described.

(1) After turning on the power (switching on), the controller 1 detects the target device 2 connected via the network at the external device I/O physical part 15. Detection of the target device 2 is, for example, carried out by a method stipulated in the IEEE 1394-1995 specification. The target device 2 transmits a connection recognition signal including device information (a device type ID, a manufacture ID and the like) to the controller 1 (S1001).

(2) The CPU 11 in the controller 1 receives, via the external device I/O link part 14, the connection recognition signal received by the external device I/O physical part 15 and stores in the RAM 12 device information of the target device 2 obtained by the connection recognition signal.

The CPU 11 assigns a node number to the detected (recognized) target device 2 and transmits its data to the target device 2 (S1002).

(3) The controller 1 transmits to the target device 2 a confirmation requesting signal (Gui_update Status command) for confirming whether the target device 2 holds operation panel data or not (S1003). Transmission of the confirmation requesting signal is performed under control of the CPU 11 in accordance with a program stored in the flash ROM 13. The confirmation requesting signal is a signal provided in advance between the controller 1 and the target device 2, which signal is transmitted in a specific format to the target device 2 via the external device I/O link part 14 and the external device I/O physical part 15.

(4) The target device 2 sends to the controller 1 response information (response) in reply to the confirmation requesting signal (S1004). From this response information, the CPU 11 can know whether the target device 2 holds operation panel data or not and where the operation panel data is when the target device does not hold the data (S1004).

For example, when the first data field in the response information is "00", the operation panel data is in the target device 2, while for the data field being "01", the operation panel data is in the data broadcast transmitted by television broadcasting. When the data field is "02", the operation panel data is in the external network server 22.

Further, when the first data field is "01", a network ID of broadcast to be received, the name of a broadcasting station, a receiving frequency, a PID, a polarization method and the like are described in another field in the response information. Thereby, the controller 1 is capable of recognizing by which channel information the operation panel data is acquired. In addition, since a receiving condition to receive the above-mentioned operation panel data is sometimes different due to a broadcasting date, a broadcasting state and the like, an address indicative of the location of the operation panel data on the network (for example, URL: Uniform Resource Locator) is stored so as to receive the operation panel data from the network server 22. Further, when the first data field is "02", an address indicative of the location of the operation panel data on the network is described in another field in the response so as to receive operation panel data from the network server 22.

In the third embodiment, it is assumed that the operation panel data is in the received data broadcast (the first data field is "01"). In this case, as is different from the first embodiment, the CPU 11 does not have a plug to establish a connection for transfer of the operation panel data with the target device 2.

(5) The CPU 11 reads a manufacture ID 612 (target_device_comp) of the target device and a device type ID 613 (target_device) thereof from the data broadcast data stored in the flash ROM 13 and searches data broadcast data which matches IDs (manufacture ID and device type ID) of the connected target device 2 one by one until the matched data broadcast data is obtained. Then, the CPU 11 reads display panel data 619 in the data broadcast data which matches the IDs of the connected target device 2 and displays a panel element based on the display panel data 619.

Figure 11:
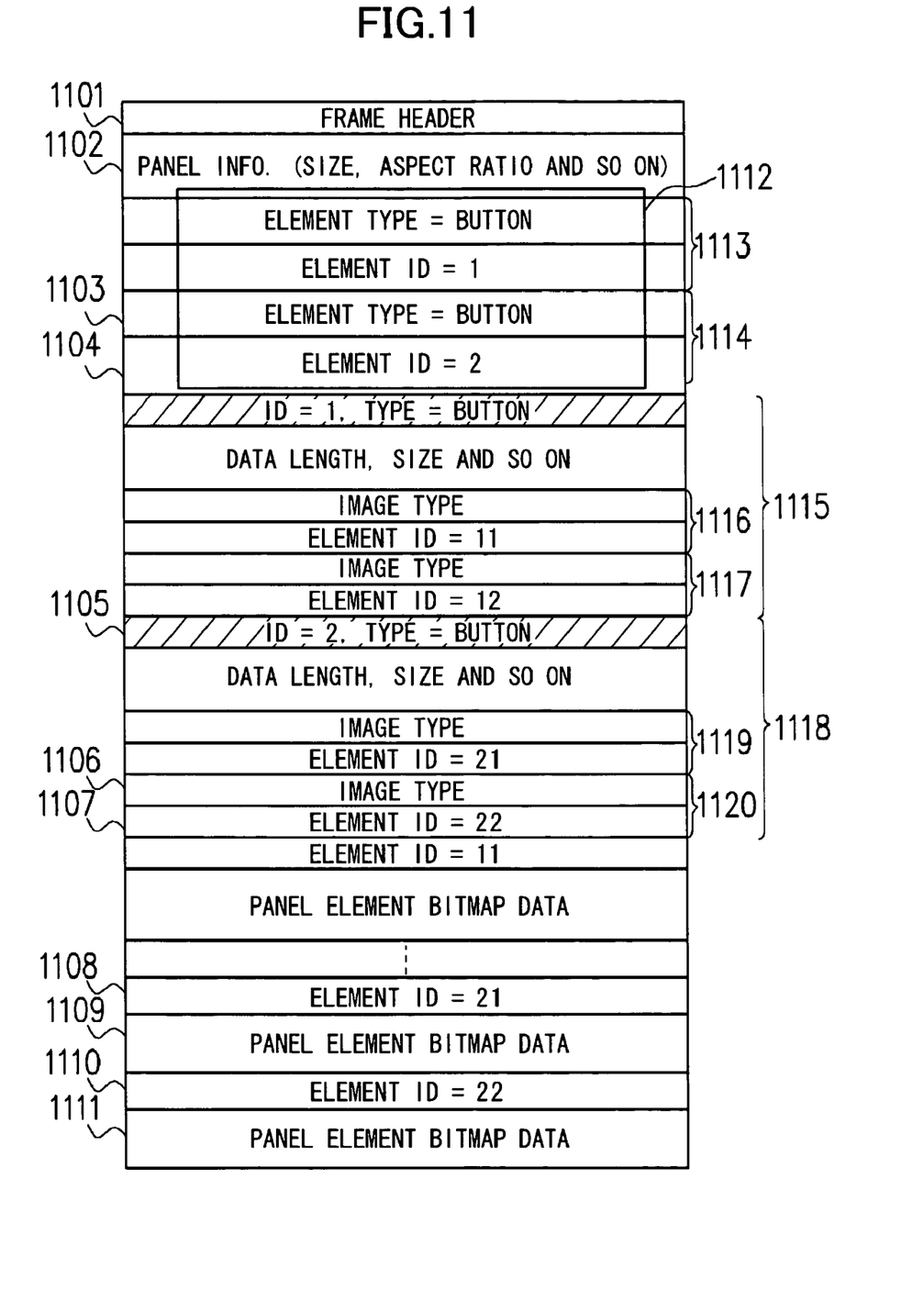
FIG. 11 is a view illustrating an example of display panel data.

An example of the display panel data 619 is shown in FIG. 11.

FIG. 11 illustrates panel elements 105 and 106 shown in FIG. 7. A data format shown in FIG. 11 is a data format used for transmitting all panel elements on the screen (panel elements 105 and 106). In FIG. 11, the panel elements consist in a large panel and link relations of the panel elements of the large panel are described.

In FIG. 11, a field 1101 is a header part which defines as one unit display panel data of the panel elements included in the operation panel, and data length and the like are described therein. In a field 1102, data such as a display size of the whole operation panel and display aspect ratio is stored, and data for determining a position in displaying on the display device 10 is written. By reading data in the field 1102 the controller 1 can know in which field in the video memory 28 display panel data of each panel element is stored.

In the field 1112, contents of each of the panel elements linked in the whole operation panel are described. For example, contents of the panel element 105 are written in a field 1113 and contents of the panel element 106 are written in a field 1114. A field 1103 holds information on the element type of the panel element 106, which is a button, here. Element types include, in addition to the button, an icon and a text, to which particular codes are assigned. In the field 1104, an element ID number is described in which detailed data of the panel element 106 is written. The fields 1103 and 1104 become a pair, and when a panel element is added, an element type and an element ID number are added as one group.

The controller 1 can recognize what panel element exists from data of the field 1112. Then, detailed data of each panel element specified by the data in the field 1104 and the like can be read by use of each element ID number in the transmitted data with reference to lower-order data (subsequently transmitted data).

For example, the detailed data of the panel element 106 is written in a field subsequent to the field 1105 (specifically, the field 1118) as is specified by the field 1104 (ID=2). In the field 1118 including the field 1105 data such as data length and button size is written. Then, each image type ("bit map" in the present embodiment) when the panel element 106 is pushed or released by a user using the remote control 18 and an element ID indicative of a location of the image data (display panel data) are written in the fields 1119 and 1120.

The image type and the element ID exist as a pair and, for example, in FIG. 11, the image type when the panel element 106 is pushed (selected) is written in the field 1106 and the element ID is written in the field 1107. For example, when the panel element 106 of the button is released, bit map data of the field 1109 below the element ID=21 (field 1108) is display panel data to be displayed, and the controller 1 displays a panel element of this element ID=21 on the operation panel.

Likewise, in the field 1115, detailed data of the panel element 105 is written, and each image type when the panel element 105 is released and pushed and an element ID indicative of a location of the image data are written in the field 1116 and 1117, respectively. In addition, when the panel element 105 of the button is released, bit map data of the field 1122 below the element ID=11 (field 1121) is display panel data to be displayed. When the panel element 106 is pushed, bit map data of the field 1111 below the element ID=22 (field 1110) is display panel data to be displayed.

Thus, to each of the panel elements, an element ID is added for every condition (pushed, released or the like), and the controller 1 reads target display panel data based on an element ID from the whole transmitted data regarding the operation panel.

(6) Then, when a user pushes on the panel element 105 by use of the remote control 18, the CPU 11 transmits to the target device 2 an action type indicative of pushing of the panel element 105 and element ID information (described in the field 1120 in FIG. 11) of the panel element 105. These data are collectively called user action data.

Figure 12:
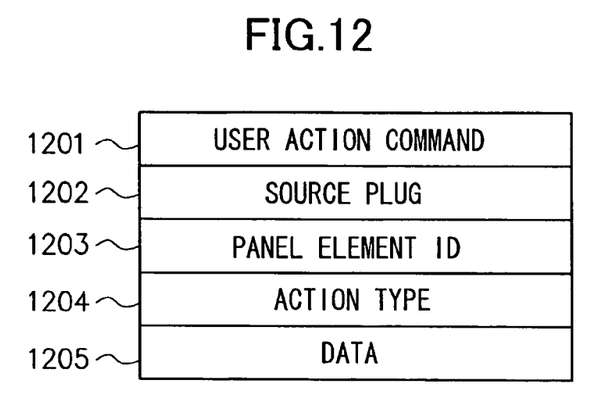
FIG. 12 is a view illustrating an example of user action data.

An example of a data format of the user action data is shown in FIG. 12. The user action data includes a user action command 1201, a source plug 1202, element ID information 1203, an action type 1204 and data 1205.

(7) The target device 2 carries out control determined by the user action, the element ID information and a result of the conditional expression. Such a control is predetermined in the target device 2. In the third embodiment, since the target device 2 does not have an operation panel, it receives only the user action only to control inside the device (slobs, S1106 and the like in FIG. 10)

As described above, according to the third embodiment, the controller 1 receives from the target device 2 a receiving condition for obtaining operation panel data regarding the target device 2, and based on the receiving condition, obtains operation panel data from the data broadcast transmitted from the broadcasting station 23 to display an operation panel based on the operation panel data.

With this configuration, only by receiving data broadcast which is transmitted from the broadcasting station 23 and matches the receiving condition, the controller 1 can obtain and change the operation panel data for controlling the target device 2 from the received data broadcast data.

In the third embodiment, the operation panel data is received directly by use of the data broadcasting, however, the operation panel data may be transmitted from the network server 22 of a manufacture which provides the target device 2 to the broadcasting station 23 via the network 29 such as the Internet, and then, received by data broadcasting to achieve the same operations. In this case, it is possible for a manufacture which provides the target device 2 to readily update the operation panel data and to readily provide a new service, while it is also possible for a user to easily obtain the latest operation panel data.

Figure 13:
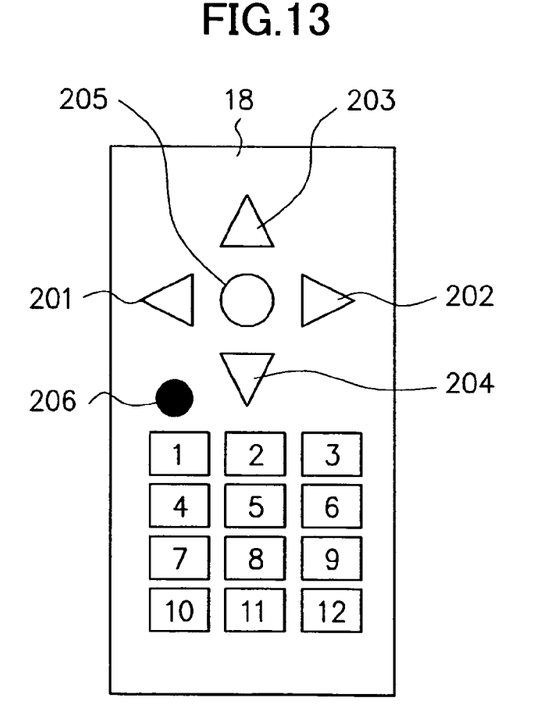
FIG. 13 is a view illustrating an operation button side of a remote control.

FIG. 13 shows an operation button side of the remote control 18 used for a user to select a panel element in the aforementioned first to third embodiments. Looking at the operation panel displayed on the display device 10, the user pushes a button 206 first. This means that after pushing the button 206, codes of arrow keys 201, 202, 203 and 204 are codes for controlling the operation panel.

While a user see the operation panel, he pushes any of the arrow keys 201 to 204. Codes in reply to this operation are output from the remote control 18 and supplied to the CPU 11 via the IR receiver 17 and the serial I/O part 16. Every time the arrow keys 201 to 204 are pushed on, the CPU 11 informs the user of which panel element is focused on by surrounding the panel element of the displayed operation panel with a heavy line. Then, when a desired panel element is surrounded with a heavy line, the user pushes a selection button 205. This code is supplied to the CPU 11 as described above, and a user action corresponding to the panel element is sent to the target device.

Another Embodiment

The present invention includes such a configuration that, in order to operate various devices so as to realize functions of the above-described embodiments, a software program code to realize functions of the above-described embodiments is supplied to a computer in a system or a device connected to the various devices so as to operate the various devices in accordance with a program stored in the computer (CPU or MPU) of the system or the device.

In addition, in this case, it is the above-mentioned software program code itself which realizes functions of the above-described embodiments, and the program code itself, means for supplying the program code to a computer and for example, a recording medium which stores the program code are also included in the present invention. Used as such a recording medium to store program codes are flexible disks, hard disks, optical disks, magnetooptical disks, CD-ROMs, magnetic tapes, nonvolatile memory cards, ROMs and the like.

Further, the above-described embodiments are realized not only by a computer executing a supplied program code. They are also realized by the program code in association with an OS (operating system) operating in the computer, another application software or the like, and such a program code is, needless to say, included in the embodiment of the present invention.

Furthermore, after the supplied program code is stored in a memory which is provided in an enhanced unit connected to a computer or an enhanced board of the computer, a CPU of the enhanced unit or enhanced board or the like performs a part of or all actual processing based on instructions of the program code. With such processing, the above-described embodiments are realized, which case is also included in the present invention.

As described above, according to the present invention, it is possible to provide an operation panel of which a service regarding a controlled device connected via a network is changeable or an operation panel with which the controlled device does not malfunction.

What is claimed is:

1. A broadcast receiving device connected with a printer through a network, comprising:
first receiving means for receiving a data broadcast signal including first operation panel data and first device type information, the first operation panel data and the first device type information being associated with each other;
a first memory for holding the first operation panel data and the first device type information received by the first receiving means;
request means for transmitting a confirmation requesting signal to the printer through the network, and for receiving a response to the confirmation requesting signal from the printer through the network, with the confirmation requesting signal for confirming whether the printer holds second operation panel data for a printer operation panel comprising a plurality of panel elements;

second receiving means for receiving, in the case that the response indicates that the printer holds the second operation panel data, from the printer through the network, second device type information indicating a device type of the printer, and the second operation panel data, wherein a condition flag for indicating whether a panel element is to be changed or not is associated with each panel element, the second device type information and the second operation panel data being associated with each other;

a second memory for holding the second operation panel data and the second device type information received by the second receiving means; and display controlling means for providing a printer operation panel display based on the second operation panel data held at the second memory;

wherein the second operation panel data is transmitted from the printer to the broadcast receiving device when remaining ink of the printer is reduced to a predetermined amount, wherein, in the case the second device type information held at the second memory is the same as the first device type information held at the first memory, the display controlling means changes a panel element of the printer operation panel derived from the second operation panel data which is associated with a condition flag to indicate that the panel element of the printer operation panel derived from the second operation panel data is to be changed by use of the first operation panel data held at the first memory, and does not change a panel element which is associated with a condition flag to indicate that the panel element is not to be changed, and wherein the first operation panel data held at the first memory includes a valid period of the first operation panel data, and the display controlling means changes the panel element of the printer operation panel derived from the second operation panel data which is associated with the condition flag for indicating that the panel element of the printer operation panel derived from the second operation panel data is to be changed when a present time is within the valid period.

2. A controlling method for a broadcast receiving device connected with a printer through a network, comprising the steps of:

receiving a data broadcast signal including first operation panel data and first device type information, the first operation panel data and the first device type information being associated with each other;

holding the received first operation panel data and the received first device type information at a first memory;

transmitting a confirmation requesting signal to the printer through the network, with the confirmation requesting signal for confirming whether the printer holds second operation panel data for a printer operation panel comprising a plurality of panel elements;

receiving a response to the confirmation requesting signal from the printer through the network;

receiving, in the case that the response indicates that the printer holds second operation panel data, from the printer through the network, second device type information indicating a device type of the printer, and the second operation panel data, wherein a condition flag for indicating whether a panel element is to be changed or not is associated with each panel element, wherein the second operation panel data is transmitted from the printer to the broadcast receiving device when remaining ink of the printer is reduced to a predetermined amount;

holding the received second operation panel data and the received second device type information at a second memory; and changing, in the case that the second device type information held at the second memory is the same as the first device type information held at the first memory, a panel element which is associated with a condition flag for indicating that the panel element is to be changed by use of the first operation panel data held at the first memory, wherein the first operation panel data held at the first memory includes a valid period of the first operation panel data, and the panel element which is associated with the condition flag for indicating that the panel element is to be changed is changed when a present time is within the valid period, and displaying a printer operation panel based on the changed second operation panel data.

3. A non-transitory computer-readable medium storing a computer executable program for executing a method according to claim 2.

* * * * *